Nov. 6, 1945.  B. R. VENT  2,388,352
COMPARING DEVICE
Filed April 27, 1942

Inventor
Bruce R. Vent
By Thomas F. Healy
Attorney

Patented Nov. 6, 1945

2,388,352

UNITED STATES PATENT OFFICE 2,388,352

COMPARING DEVICE

Bruce R. Vent, Michigan City, Ind., assignor to Temp-R-Lens Corporation, Michigan City, Ind., a corporation of Indiana Application April 27, 1942, Serial No. 440,707

10 Claims. (Cl. 35—50)

The present invention relates to a comparing device and more particularly to a certificate provided with one or more photographic reproductions or prints of stress patterns visible in toughened glass through polarized light.

The invention contemplates a method and apparatus for comparing the stress pattern in any one or more toughened glass pieces, such as toughened ophthalmic lenses with one or more reproductions of stress patterns, for the purpose of identifying the origin of the toughened glass under consideration and to ascertain the type of process used in toughening the glass.

An object of the invention is to provide a certificate to accompany the sale of spectacles, such as toughened rimless glasses, so as to safeguard the purchaser from unknowingly accepting untoughened rimless glasses while paying for toughened rimless glasses.

Another object is to provide a certificate to accompany the sale of toughened lenses and carrying a picture of a stress pattern resulting from a certain toughening process and which is present in toughened but not in untoughened lenses. Said certificate further being provided with polaroid skins positioned so that the lenses in the glasses may be selectively viewed through said polaroid skins and the purchaser may compare the stress pattern visible through polarized light with the picture of the stress pattern on the certificate to see if the lenses have been processed by a toughening method the same or similar to the type of process indicated on the certificate, or whether the lenses have been toughened by any process.

A further object is to provide a novelty device particularly suitable for comparing products being purchased with an acceptable standard.

A further object is to provide a novelty certificate or comparing device having an apertured body portion and carrying polaroid skins having their axes disposed at right angles to each other or substantially at right angles to each other so that substantially no light passes through the skins and aperture.

Other and further objects and advantages of this invention will be apparent from the following description thereof and from the claims appended thereto.

In the drawing, wherein like numerals refer to like or corresponding parts throughout the several views.

Figure 1:
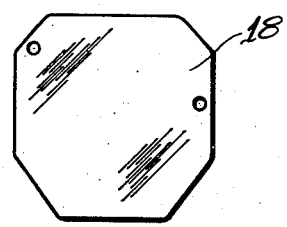
Figure 1 depicts a toughened drilled rimless lens for use in rimless spectacles as viewed through normal light, i. e., unpolarized light.

In carrying out the invention, I prefer to employ a certificate generally indicated by the numeral 10. The certificate 10 may be made from any suitable material but preferably from easily foldable and durable material, such as a better grade of paper or parchment. The certificate 10 may have printed matter on the front face thereof, and/or on any other face to indicate the use and operation thereof, and additionally, to serve as a guarantee slip when the certificate accompanies a sale of toughened lenses.

On the front face of the certificate 10, e. g., in the upper lefthand corner, there is disposed a picture or photographic reproduction 11 of a stress pattern as seen in a lens through polarized light. The picture 11 shows a cross-shaped stress pattern which fans out from a central point. The shape of the stress pattern will vary depending upon the toughening method employed, i. e., the method utilized to set the stress in the lens by rapidly conducting heat away from one or more points on the heated lens surface during the toughening step, while the remaining portion of the lens more naturally cools. Certificate 10 is of the fold-over type and is provided with front face or portion 12 and rear or back face or portion 13.

The certificate 10 is also provided with apertures 14 and 15 passing through the front and back faces 12 and 13, respectively, of said certificate in registering position. The apertures are shown as being circular but may be of any other desired geometrical configuration.

The aperture 14 disposed in the front face 12 is covered with a polaroid skin 16 which is secured to the backside of the front face 12 by adhesive, adhesive tape, or in any other suitable manner.

The aperture 15 disposed in the back face 13 is covered with a polaroid skin 17 fastened to the inner side of back face 13 in a manner like skin 16 so that skins 16 and 17 are back to back when the certificate 10 is in closed position and in alignment.

The polaroid skins or films 16 and 17 have their axes arranged at right angles one to the other so that stresses in lenses which are disposed between said films become visible through the polaroid skins 16 and 17 when the same are held up to a light source.

Figure 2:
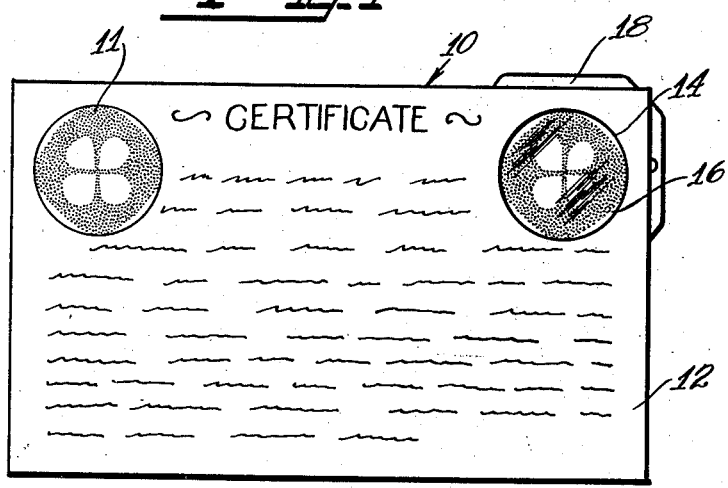
Figure 2 depicts the certificate in folded form wherein the lens of Figure 1 is visible through the polaroid skins in the upper right-hand corner of the certificate, and showing the normally invisible stress pattern of the lens of Figure 1 as it fans out from a central point.
Figure 3:
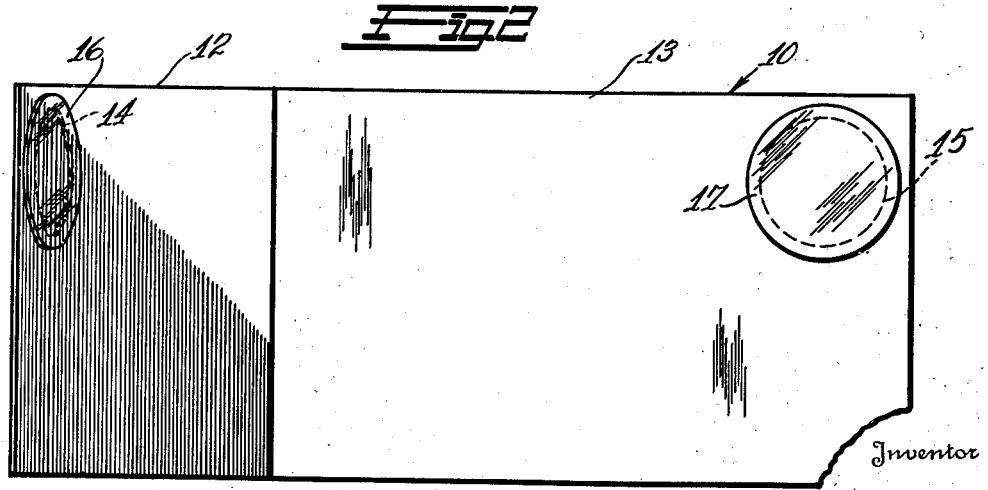
Figure 3 shows the certificate in unfolded form.

In operation any lens, such as a drilled lens 18, which has been toughened according to the type of process indicated on the face of certificate 10 is positioned between the skins 16 and 17, as shown in Figure 2. When the certificate is held up to the light, the stress pattern will become visible and its shape can be compared with the shape of the stress pattern pictured on the certificate. An absence of any stress pattern will indicate that the lens has not been toughened by any process, while the presence of a stress pattern substantially different from the one pictured on the certificate will indicate the use of a different toughening process than the one specifically indicated in writing on the face of the certificate. In actual practice the lenses of the spectacles can be compared while in their mounted and ready-to-use form just prior to the sale of the spectacles provided with toughened lenses.

It is preferred that the picture of the stress 11 and the aperture 14, which registers with aperture 15, be in spaced apart horizontal alignment to facilitate an easy comparison of the stress patterns by the observer. The size of apertures 14 and 15 may vary to include the total visible stress pattern, or any portion thereof.

The certificate 10 may have any reasonable dimensions. It has been found convenient to employ a certificate having a length of 3¾ inches, a width of 2¼ inches, with the circular apertures 14 and 15 and the circular picture 11 each having a diameter of one inch. The dimensions of the certificate are optional depending upon the use to which it is put.

If the diameter of the circular apertures 14 and 15 is made too small or too large, relative to the diameter of the circular picture 11, a true comparison of stress patterns is not obtainable. Also, if the diameter of the circular apertures is too great, the cost of certificate is increased substantially, due to the increased area covered by polaroid skins.

It is preferred that circular apertures 14 and 15 and circular picture 11, each have the same diameter, say ¾ of an inch, or any other diameter which will permit the comparison of a predominating portion of a stress pattern in a toughened lens with the picture of the stress pattern or the predominating portion of the stress pattern appearing on the certificate. For purposes of comparison it is not necessary that the whole stress pattern be visible through the polaroid skins provided that such a predominating portion is visible that the general shape and configuration thereof can be compared with stress pattern of the picture. Consequently, smaller apertures 14 and 15 may be employed, with a corresponding decrease in the portion of the stress pattern shown in the picture so that a true basis of comparison is maintained. In practice, an actual picture is taken of the stress pattern in a lens as viewed through the apertures 14 and 15. This reproduction will serve as a true basis of comparison, for each lens toughened by the particular process indicated on the certificate 10 will have an identical stress pattern when treating lenses of like size and thickness, or so near identical that an observer would know that the lenses were treated by the same toughening method.

It is preferred to employ a fold-over type of certificate to facilitate ready observation of the stress pattern when the lenses are mounted in frames. However, it is possible to employ a certificate having only a front and back face. This is possible by featuring a pocket arrangement of the polaroid skins so disposed that the toughened lenses may be selectively inserted in the pocket for comparison with the picture appearing on the certificate. Any desirable material may be employed.

This invention embraces the concept of comparing stress patterns in glass, whether well-defined or conglomerate, with a picture or reproduction of a stress pattern formed in glass by a particular type of toughening method. For example, lenses toughened by heating the same to soften the surfaces thereof, and rapidly conducting heat away from oppositely disposed points on the heated lens surface, will provide a cross-shaped stress pattern having its arms fan out from the central point from which heat is rapidly conducted. A comparison of the cross-shaped stress pattern in the toughened lens with the cross-shaped stress pattern of the picture will indicate that the lens has been toughened by a point conducting method.

The invention further contemplates a comparing device or novelty comprising an apertured body portion, with at least two polaroid films associated with the body portion in registry or substantial registry with the apertured portion of the body portion, and with the axes of said polaroid films being at right angles or substantially at right angles to each other so as to preclude the normal passage of light through the polaroid films and apertured portion of said body portion to such an extent that when a toughened lens or other piece of glass or the like is disposed between the two polaroid skins in registry with said apertured portion and held up to the light, a stress pattern becomes visible for comparison with another stress pattern for purposes of identification.

It is to be understood that certain modified forms of this invention will be apparent to those skilled in the art without departing from the spirit thereof, and it is desired to be limited only by the prior art and the scope of the appended claims.

Having thus described my invention, I claim:

1. A fold-over flexible comparing device adapted for comparing two stress patterns one of which appears in a lens and is normally invisible, comprising a body portion having front and rear portions, said front portion having an aperture therethrough, a polaroid skin covering said aperture and secured to said front portion, said rear portion having an aperture therethrough in registry with said first-mentioned aperture when the comparing device is in folded form, a polaroid skin covering said second-mentioned aperture and secured to said rear portion, said polaroid skins having their axes disposed at right angles one to the other so that light does not normally pass therethrough, and a picture of a stress pattern disposed on the front part of said front portion in spaced-apart relation to the aperture pasing therethrough, whereby a stress pattern appearing in a toughened lens disposed between said polaroid skins can be compared with said picture of a stress pattern disposed on the front part of said front portion.

2. A comparing device adapted for comparing two stress patterns, one of which appears in a lens and is normally invisible, comprising a body portion having an aperture passing therethrough, two polaroid skins carried by said body portion and having their axes disposed at right angles one to the other so that light does not normally pass therethrough, said polaroid skins being in registry with said aperture, and a picture of a stress pattern disposed on said body portion, whereby a stress pattern appearing in a toughened lens disposed between said polaroid skins can be compared with said picture of a stress pattern disposed on said body portion.

3. A fold-over flexible comparing device adapted for comparing two strain patterns one of which appears in a toughened lens and is normally invisible, comprising a rectangular body portion having front and rear portions, said front portion having a circular aperture therethrough, a polaroid skin covering said aperture and secured to said front portion, said rear portion having a circular aperture therethrough in registry with said first mentioned aperture when the comparing device is in folded form, a polaroid skin covering said second-mentioned aperture and secured to said rear portion, said polaroid skins having their axes disposed at right angles one to the other so that light does not normally pass therethrough when the said device is in folded form, and a picture of a strain pattern disposed on the front part of said front portion in horizontally spaced relation to the aperture passing therethrough, whereby a strain pattern appearing in a toughened lens disposed between said polaroid skins can be compared with said picture of a strain pattern disposed on the front part of said front portion.

4. A novelty device comprising a fold-over body portion consisting of front and rear sections, said front and rear sections having openings passing therethrough in registry when said body portion is in folded form, a polarizing film carried by each of said sections and covering each said openings, and said polarizing films having their axes disposed at right angles one to the other so that light does not normally pass through said openings when the said body portion is in folded form.

5. A fold-over comparing device comprising a body portion having front and rear portions, said front portion having an aperture therethrough, a polaroid skin covering said aperture and secured to said front portion, said rear portion having an aperture therethrough in registry with said first mentioned aperture when the comparing device is in folded form, a polaroid skin covering said second mentioned aperture and secured to said rear portion, said polaroid skins having their axes disposed at right angles to each other so that light does not normally pass through said openings when said device is in folded form, and a pictorial representation disposed on the front part of said front portion in spaced-apart relation to the aperture passing therethrough.

6. A comparing device for comparing patterns appearing in toughened glass blanks with a pictorial representation comprising, a body portion provided with an aperture passing therethrough, polarizing films carried by said body portion and disposed relatively to said aperture so that light does not normally pass through said aperture and said polarizing films, and a pictorial representation disposed on said body portion, whereby patterns appearing in toughened glass blanks disposed between said polarizing films can be compared with said pictorial representation.

7. A comparing device adapted for comparing a strain pattern in a toughened glass blank with another strain pattern comprising, a body portion provided with an aperture passing therethrough, and polarizing films associated with said body portion and disposed relatively to said aperture so that light does not normally pass through said aperture and said polarizing films, whereby a strain pattern appearing in a toughened glass blank can be compared with another strain pattern by disposing said blank between said polarizing films.

8. A novelty device for detecting normally invisible strain patterns in a glass blank comprising, a body portion provided with an aperture passing therethrough, and polarizing films associated with said body portion and said aperture and having their axes disposed substantially at right angles one to the other so that a normally invisible strain pattern in a glass blank becomes visible when said blank is disposed between said polarizing films.

9. A novelty device for detecting normally invisible strain patterns in glass blank portions, comprising a body portion provided with an aperture, and refraction polarizing films associated with said body portion and disposed relatively to said aperture so that a normally invisible strain pattern in a glass blank becomes visible when said blank is disposed between said polarizing films.

10. A novelty device for detecting normally invisible strain patterns in a glass blank comprising a body portion composed of paper or like flexible material and provided with an aperture passing therethrough, and refraction polarizing films carried by said body portion and disposed relatively to said aperture so that a normally invisible strain pattern in a glass blank becomes visible when said blank is disposed between said polarizing films.

BRUCE R. VENT.